(12) United States Patent
Xu

(10) Patent No.: US 8,366,173 B2
(45) Date of Patent: Feb. 5, 2013

(54) LOCKING DEVICE OF CAR COVERS FOR PICK-UP TRUCKS

(76) Inventor: Enli Xu, NingBo (CN)

(*) Notice: Subject to any disclaimer, the term of this patent is extended or adjusted under 35 U.S.C. 154(b) by 0 days.

(21) Appl. No.: 13/122,640

(22) PCT Filed: Nov. 30, 2009

(86) PCT No.: PCT/CN2009/001347
§ 371 (c)(1),
(2), (4) Date: Apr. 5, 2011

(87) PCT Pub. No.: WO2011/050503
PCT Pub. Date: May 5, 2011

(65) Prior Publication Data
US 2011/0260493 A1    Oct. 27, 2011

(30) Foreign Application Priority Data

Oct. 27, 2009    (CN) .................... 2009 2 0211388 U

(51) Int. Cl.
*B60P 7/04*    (2006.01)
(52) U.S. Cl. .............................. 296/100.16; 248/229.12
(58) Field of Classification Search ............. 296/100.16; 248/229.12, 229.14, 229.21, 229.24
See application file for complete search history.

(56) References Cited

U.S. PATENT DOCUMENTS

| 4,817,999 | A  |   | 4/1989  | Drew |  |
|---|---|---|---|---|---|
| 5,435,615 | A  |   | 7/1995  | Schmitz |  |
| 7,188,888 | B2 | * | 3/2007  | Wheatley et al. | ........ 296/100.04 |
| 7,258,387 | B2 | * | 8/2007  | Weldy | ....................... 296/100.07 |
| 8,146,982 | B2 | * | 4/2012  | Williamson et al. | ..... 296/100.16 |
| 2002/0093203 | A1 |  | 7/2002 | Moretz |  |
| 2008/0129077 | A1 | * | 6/2008 | Weldy | ...................... 296/136.03 |
| 2010/0270824 | A1 | * | 10/2010 | Yue | ........................... 296/100.07 |

FOREIGN PATENT DOCUMENTS

| CN | 2834995 Y | 11/2006 |
| CN | 201287614 Y | 8/2009 |
| EP | 0018304 A1 | 10/1980 |
| EP | 1830022 A2 | 9/2007 |
| JP | 2005239046 A | 9/2005 |

* cited by examiner

Primary Examiner — Dennis Pedder
(74) Attorney, Agent, or Firm — Houtteman Law LLC

(57) ABSTRACT

This utility model is provide a locking device of car covers for pick-up trucks composing a swing stem and a lock hook inserted and deposited on the swing stem, the end part of the swing stem is inserted into a locking swing handle, a hinge block is disposed on the car cover, which is characterized in that the top of the swing stem is positioned and hinged on the hinge block. The advantages of this utility model are summarized as: to overcome the sliding friction of existing lock devices, to enhance the force born by the main body of device and to increase the flexibility of the swing stem.

2 Claims, 6 Drawing Sheets

LOCKING DEVICE OF CAR COVERS FOR PICK-UP TRUCKS

TECHNICAL DOMAIN

This utility model relates a locking device of car covers for pick-up trucks

TECHNICAL BACKGROUND

The pick-up truck is a kind of extremely utility vehicle; it is not only a manned car but is also a loading truck. However, the car of the pick-up truck is without roof, thus the goods inside are easily in sun scorched and rain drenched. The wind resistance thereof during running is rather higher compared to sedans or light vans. In view of this the car cover of pick-up trucks has been invented. The car cover is of a soft cover, which is hinged with the car and covers the car, accomplishing the result of protecting inside goods and saving consumption of the fuel.

Figure 1:
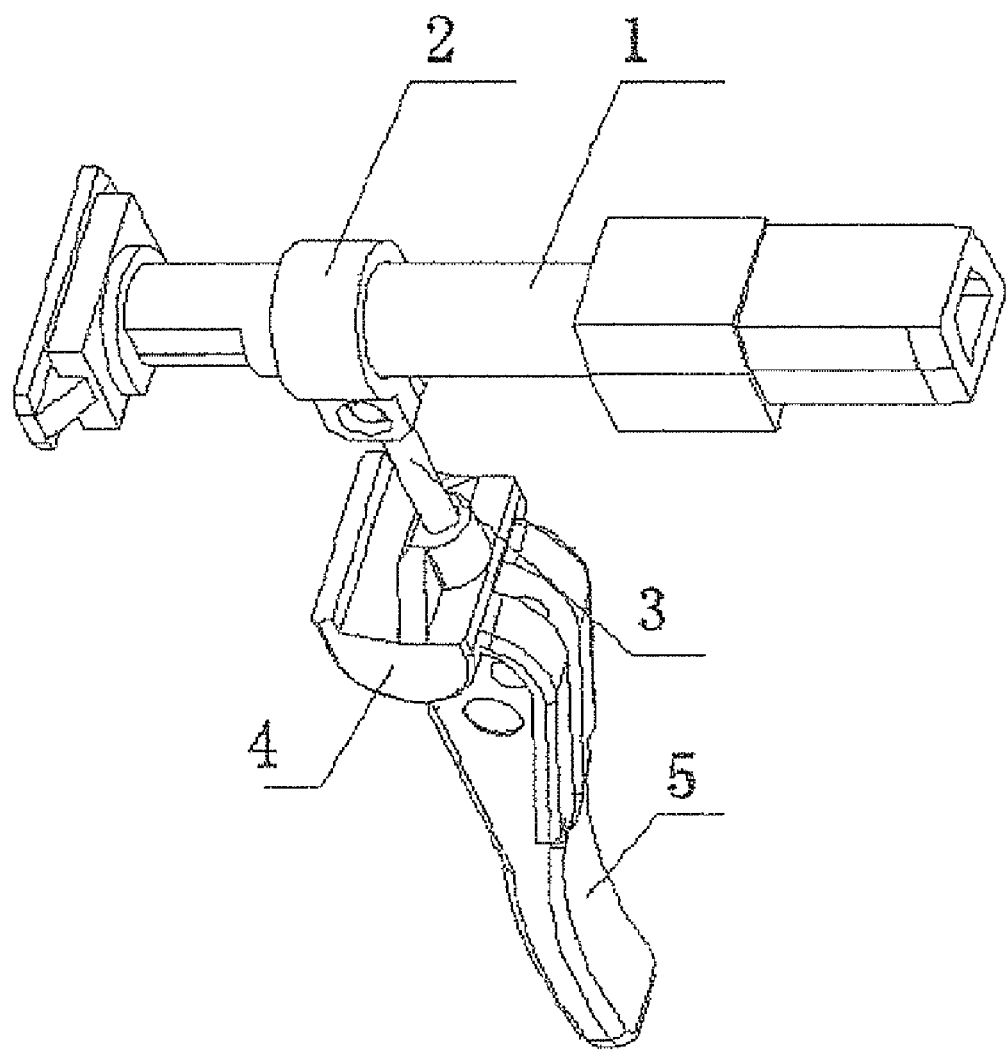
Figure 2:
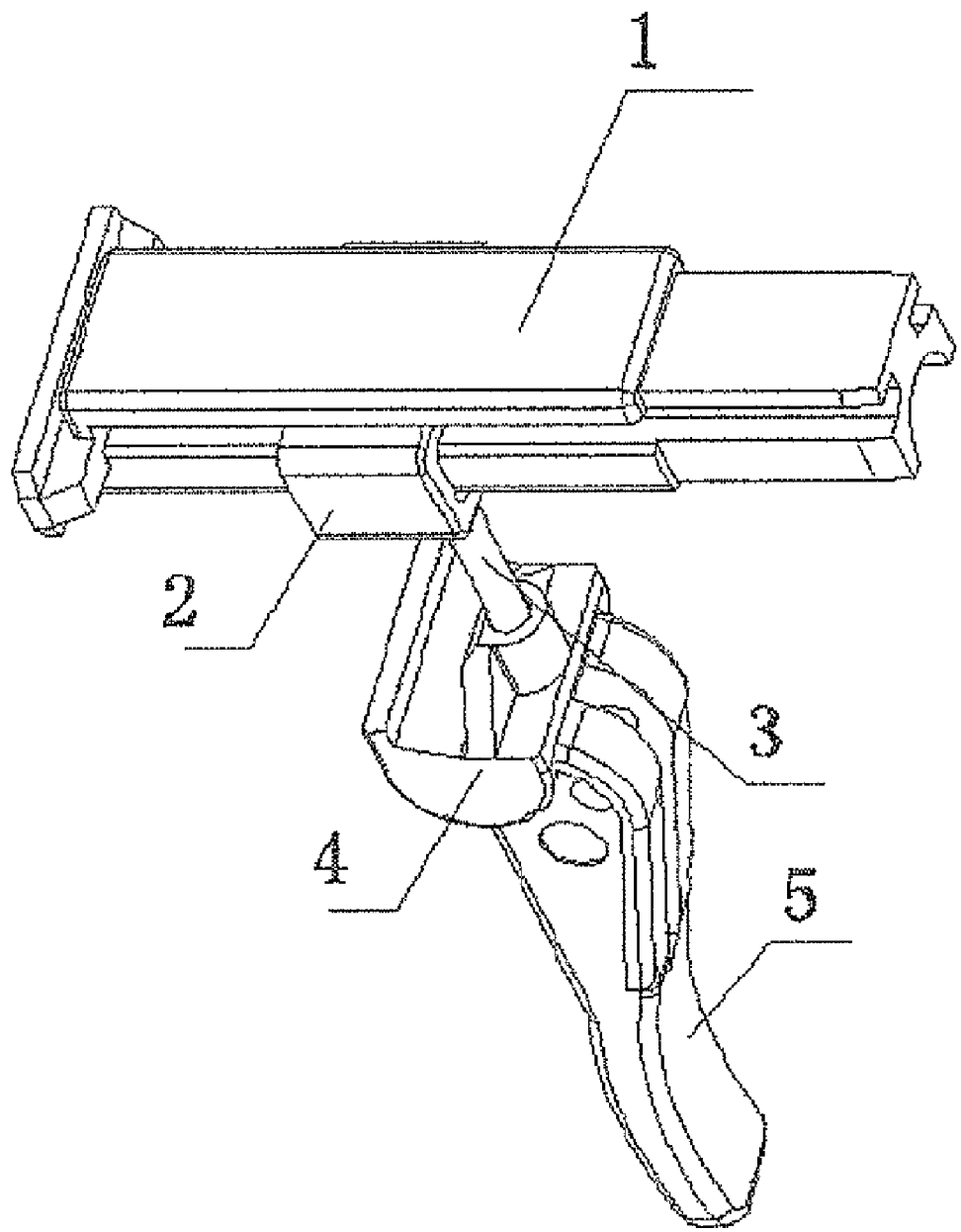
Figure 3:
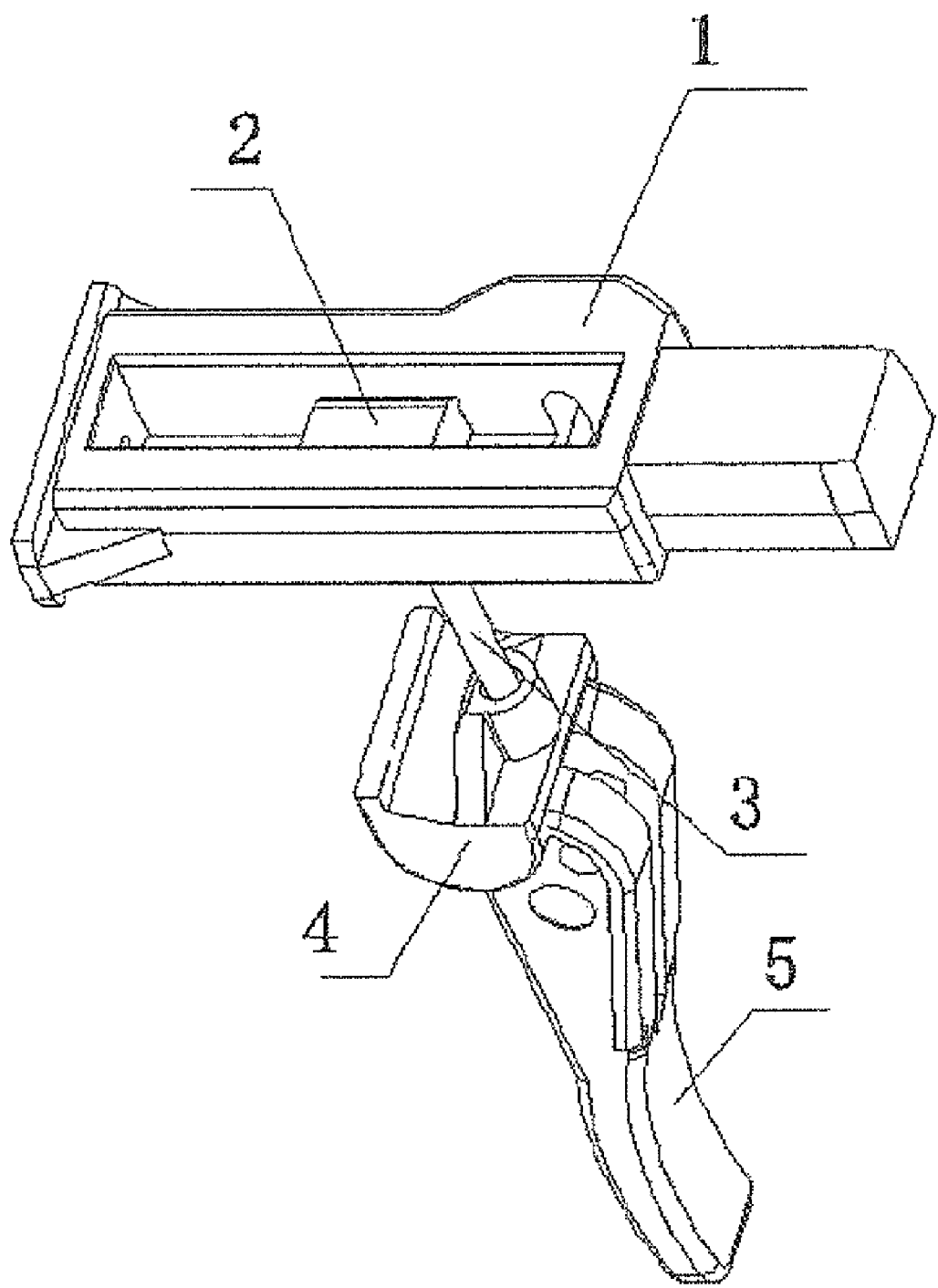

The locking devices are commonly disposed on the bottom of car covers. Those locking devices have different kinds of constitution, among them the dominating ones are mentioned as follows: as shown in FIG. 1, it is a locking device with annular constitution composing a pedestal 1 which is fixed on the car cover, an annular case 2 slips on pedestal 1, the one end of a swing stem 3 is disposed on the annual case 2 in such a way that it can swing back and forth, the other end of the swing stem 3 pierces through a lock hook 4 and is inserted into a swing handle 5. As shown in FIG. 2, it is a locking device with I shaped constitution composing a pedestal 1 with a coulisse 1, the pedestal 1 is fixed on the car cover, a I shaped slider 2 pierces though a coulisse 4 on the pedestal 1, the one end of a swing stem 3 disposed on the bottom of the I shaped slider 2 in such a way that it can swing back and forth, the other end of the swing stem 3 pierces through a lock hook 4 and is inserted into a swing handle 5. As shown in FIG. 3, it is a locking device with coulisse constitution composing a pedestal 1 with a coulisse in middle, a slider 2 is inserted into the coulisse of the pedestal 1, the one end of a swing stem 3 is connected with a "-" character shaped slider 2, the other end of the swing stem 3 pierces through a lock hook 4 and is inserted into a swing handle 5.

Although the locking devices above mentioned can accomplish the result of hinging the car cover on the car for covering, they have a common shortage, i.e. the main body of constitution can only bear insufficient force, and is easily subject to deformation: in the process of locking tight, the mentioned annual case 2, the I shaped slider 2 and the "-"character shaped slider 2 all produce sliding friction. If this kind of friction is too larger, then the operation will be difficult, if this kind of friction is too smaller, then it is easily slipped and cause the locking between the car and car cover insufficiently tight.

NATURE OF INVENTION

The purpose of this utility model is to provide a locking device, the main body of which can bear sufficient force and is not easy to produce any kind of sliding friction.

For above mentioned purpose, the technical proposal of this utility model is provide a locking device of car covers for pick-up trucks composing a swing stem and a lock hook inserted into and deposited on a swing stem, the end part of the swing stem is inserted into a locking swing handle, a hinge block is disposed on the car cover, which is characterized in that the top of the swing stem is positioned and hinged on the hinge block.

DESCRIPTION OF DRAWINGS ATTACHED

Figure 4:
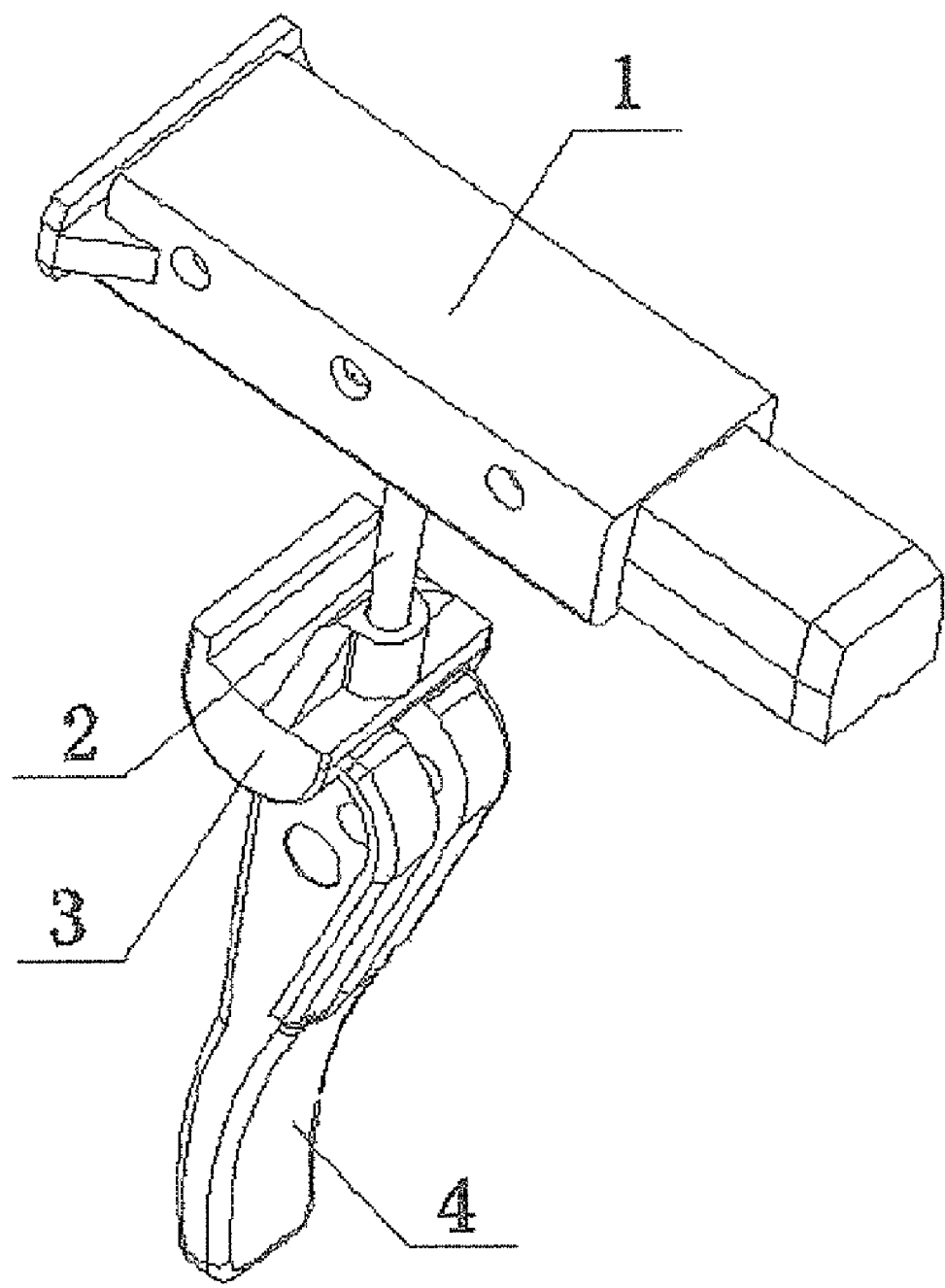
Figure 5:
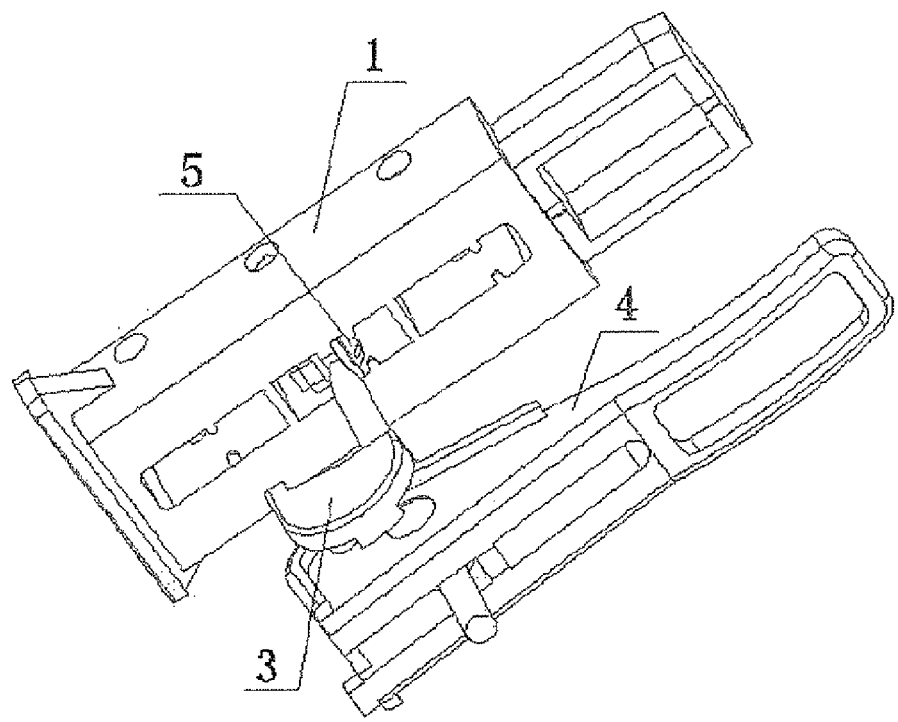
Figure 6:
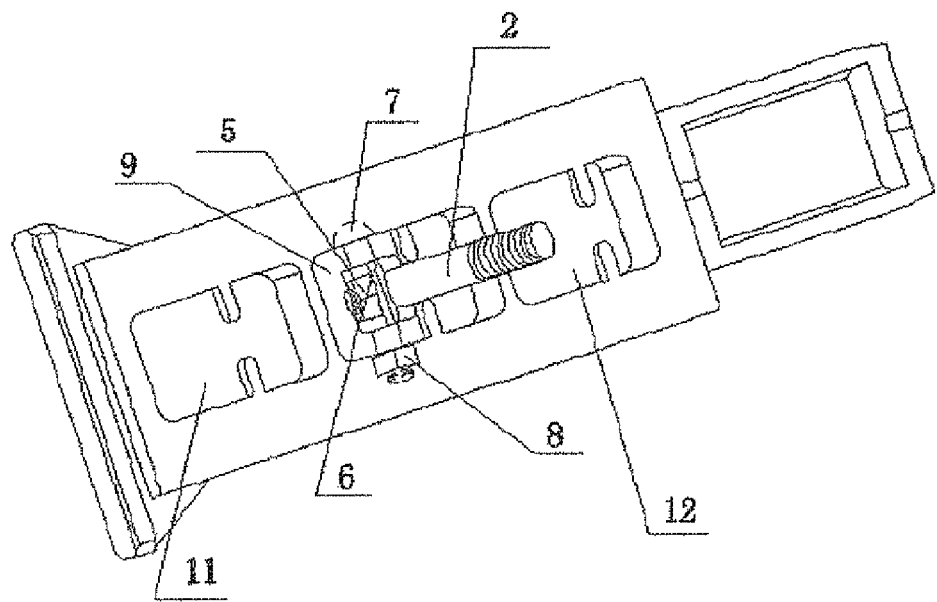
Figure 7:
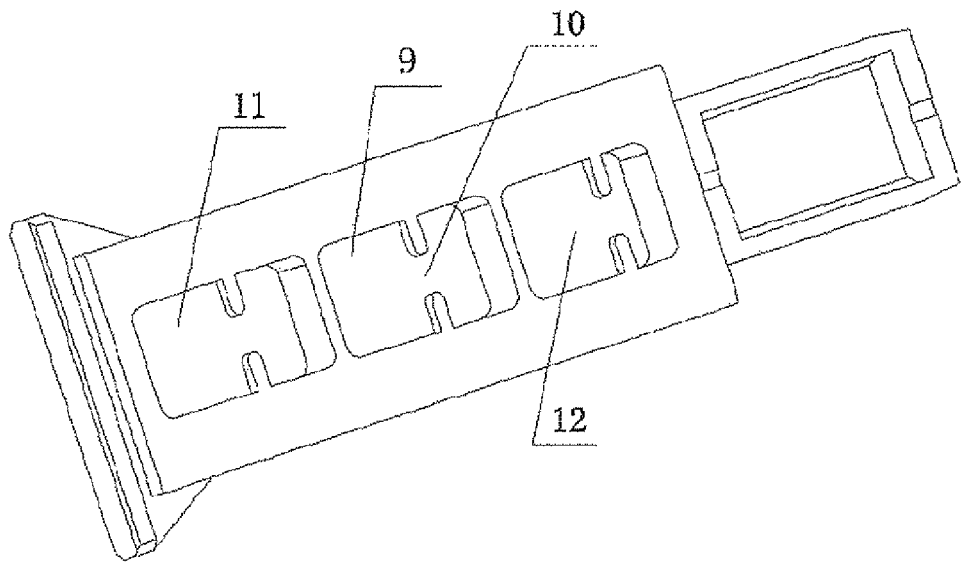
Figure 8:
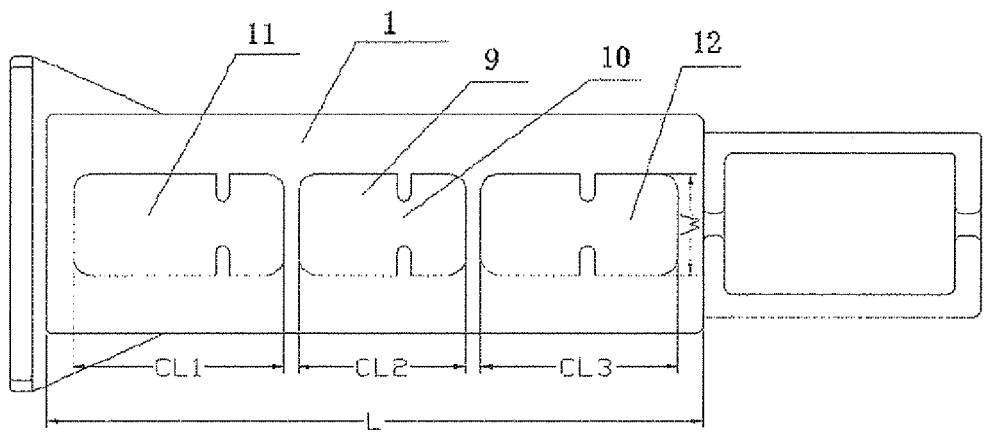
Figure 9A:
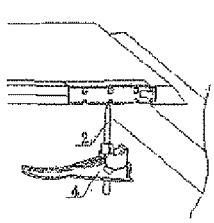
Figure 9B:
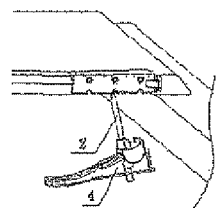
Figure 9C:
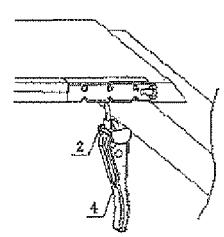

FIG. 1 is a schematic view showing the locking device with an annual constitution;
FIG. 2 is a schematic view showing the locking device with a I shaped constitution;
FIG. 3 is a schematic view showing the locking device with a coulisse constitution;
FIG. 4 is an isometric top view drawing of a locking device provided by this utility model;
FIG. 5 is an isometric bottom view drawing of a locking device provided by this utility model;
FIG. 6 is an isometric bottom view drawing of a hinge block with a screw stem;
FIG. 7 is an isometric bottom view drawing of a hinge block;
FIG. 8 is a bottom view drawing of a hinge block;
FIG. 9A is showing an initial operating stage of a locking device provided by this utility model;
FIG. 9B is showing an intermediate process of a locking device provided by this utility model;
FIG. 9C is a using rendering of a locking device provided by this utility model.

EXAMPLE OF IMPLEMENTATION

As shown in FIG. 4 and FIG. 5, there are schematic views of a locking device provided by this utility model composing a swing stem 2 and a lock hook 3 inserted into and disposed on the swing stem 2, the end part of the swing stem 2 is inserted into a locking swing handle 4, a hinge block 1 is disposed on a car cover, the top of the swing stem 2 is positioned and hinged on the hinge block 1.

There is an embodiment illustrated in the accompanying with FIG. 6 and FIG. 7: at least one groove 9 cut on the hinge block 1, there are three grooves totally in this example, i.e. the first groove 11, the groove 9 and the second groove 12. The first screw stem 7 is disposed on a hinge block 1, the screw part of the screw stem 7 pierces through the groove 9, the first screw stem 7 can either be disposed on the first groove 11 or on the second groove 12. An iron ring 6 is secured to the top end of the swing stem 2 via the second screw stem 5. The end part of the first screw stem 7 pierces through the iron ring 6 and is tightened with a nut 8. Thus, the swing stem 2 is pivotally couples with the screw part of the first screw stem 7 and thus can be swung pivotally around the first screw stem 7. A clamping tray 10 is formed in the groove 9, the clamping tray 10 is located in the right side of the swing stem 2. The clamping tray 10 is used for fixing the swing stem 2, when the car cover being opened the lock hook 3 does not hitch the inner side wall of the car cover of pick-up trucks, thus the car cover is opened smoothly.

As shown in FIG. 8, if the length of hinge block 1 is 90 mm, then the dimensions of three grooves and three holes in the hinge block 1 are embodied as follows:
The total length of three grooves is 83 mm, width (W) of three grooves equals each other, and is 14 mm. The length of the first groove 11 (CL1), length of the groove 9 (CL2) and length of the second groove 12 (CL3) are 29 mm, 23 mm and 27 mm, respectively.

The operation process of a locking device provided by this utility model as shown in FIG. 9A to FIG. 9C, during operation, at first turn the locking swing handle 4 for adjusting the hinge hook 3 to a proper elevation, as shown in FIG. 9A, and then move the swing stem 2 for the lock hook 3 notching the car inner side wall of the pick-up truck as shown in FIG. 9B. Finally, move the locking swing handle 4 down for fastening the car cover on the pick-up truck.

The invention claimed is:

1. A locking device of car covers for pick-up trucks, comprising, a swing stem (2);
   a lock hook (3) inserted into and disposed on the swing stem (2), a first end part of the swing stem (2) being inserted into a locking swing handle (4);
   a hinge block (1) is disposed on a car cover;
   at least one groove (9) cut on the hinge block (1);
   a first screw stem (7) is disposed on the hinge block (1), a screw part of the first screw stem (7) piercing through the groove (9); and
   an iron ring (6) secured with a second end part of the swing stem (2) via a second screw stem (5), wherein the iron ring (6) is pivotally coupled with the first screw stem (7) and thus pivotally coupled with the hinge block (1).

2. The locking device of car covers for pick-up trucks according to claim 1, characterized in that a clamping tray (10) is formed in the groove (9) located at a side of the first screw stem (7).

* * * * *